(12) United States Patent
Lilliebjerg

(10) Patent No.: US 7,984,446 B1
(45) Date of Patent: Jul. 19, 2011

(54) METHOD AND SYSTEM FOR MULTITASKING BIOS INITIALIZATION TASKS

(75) Inventor: Erik Lilliebjerg, Higley, AZ (US)

(73) Assignee: NVIDIA Corporation, Santa Clara, CA (US)

( * ) Notice: Subject to any disclaimer, the term of this patent is extended or adjusted under 35 U.S.C. 154(b) by 923 days.

(21) Appl. No.: 10/666,418

(22) Filed: Sep. 18, 2003

(51) Int. Cl.
*G06F 9/46* (2006.01)
*G06F 9/00* (2006.01)

(52) U.S. Cl. ........ 718/103; 718/102; 718/106; 718/107; 713/1; 713/2

(58) Field of Classification Search .......... 718/100–108; 713/1–2
See application file for complete search history.

(56) References Cited

U.S. PATENT DOCUMENTS

| | | | |
|---|---|---|---|
| 4,318,173 A * | 3/1982 | Freedman et al. | 718/103 |
| 4,847,751 A * | 7/1989 | Nakade et al. | 718/107 |
| 5,168,566 A * | 12/1992 | Kuki et al. | 718/103 |
| 5,465,335 A * | 11/1995 | Anderson | 718/107 |
| 5,499,370 A * | 3/1996 | Hosaka et al. | 718/102 |
| 5,701,481 A * | 12/1997 | Hosaka et al. | 718/106 |
| 5,740,183 A | 4/1998 | Lowe | |
| 5,795,297 A * | 8/1998 | Daigle | 600/447 |
| 5,797,003 A | 8/1998 | Voce | |
| 6,016,554 A | 1/2000 | Skrovan et al. | |
| 6,018,808 A | 1/2000 | Schieve | |
| 6,330,583 B1 | 12/2001 | Reiffin | |
| 6,336,185 B1 | 1/2002 | Sargenti, Jr. et al. | |
| 6,401,202 B1 * | 6/2002 | Abgrall | 713/2 |
| 6,487,612 B1 * | 11/2002 | Sueyoshi et al. | 710/14 |
| 6,487,656 B1 | 11/2002 | Kim et al. | |
| 6,732,264 B1 * | 5/2004 | Sun et al. | 713/2 |
| 6,757,897 B1 * | 6/2004 | Shi et al. | 718/102 |
| 6,791,572 B1 | 9/2004 | Cloney et al. | |
| 6,892,304 B1 | 5/2005 | Galasso et al. | |
| 7,051,331 B2 * | 5/2006 | Bower, III | 718/107 |
| 7,149,823 B2 | 12/2006 | Miller et al. | |
| 7,185,189 B2 | 2/2007 | Stevens | |
| 7,296,270 B2 * | 11/2007 | Wetzel et al. | 718/106 |
| 7,296,271 B1 * | 11/2007 | Chalmer et al. | 718/108 |
| 2002/0069308 A1 * | 6/2002 | Jones et al. | 710/5 |
| 2002/0188713 A1 * | 12/2002 | Bloch et al. | 709/223 |
| 2004/0010773 A1 * | 1/2004 | Chan et al. | 717/104 |
| 2004/0045003 A1 * | 3/2004 | Lake | 718/103 |

* cited by examiner

*Primary Examiner* — Jennifer N To

(57) ABSTRACT

A method and system for multitasking BIOS initialization tasks are disclosed. The BIOS utilizes preemptive multitasking and cooperative multitasking. The preemptive multitasking and the cooperative multitasking increase utilization of the processing power of a processor and ensure higher priority valued tasks are executed with less interruption than lower priority valued tasks. During execution, each task is able to request a particular waiting period.

12 Claims, 5 Drawing Sheets

METHOD AND SYSTEM FOR MULTITASKING BIOS INITIALIZATION TASKS

BACKGROUND OF THE INVENTION

1. Field of the Invention

Embodiments of the present invention generally relate to the BIOS (Basic Input Output System). More particularly, embodiments of the present invention relate to multitasking BIOS initialization tasks.

2. Related Art

A BIOS (Basic Input Output System) uses a Central Processing Unit (CPU) to perform tasks such initialization tasks, diagnostics, loading the operating system kernel from mass storage, and routine input/output functions. The number of initialization tasks can be 100 or greater. In general, the BIOS is single tasking in that if a wait period is needed by one of the currently executing initialization task, the processing power of the CPU is not utilized during the waiting condition by another initialization task. The wait period may arise because the BIOS interfaces with many hardware components. The BIOS needs the wait period due to several reasons. For example, the BIOS waits to receive a response from the hardware component or waits for the hardware component to complete some action requested by the BIOS.

SUMMARY OF THE INVENTION

A method and system for multitasking BIOS initialization tasks are disclosed. The BIOS utilizes preemptive multitasking and cooperative multitasking. The preemptive multitasking and the cooperative multitasking increase utilization of the processing power of a processor and ensure higher priority valued tasks are executed with less interruption than lower priority valued tasks. During execution, each task is able to request a particular waiting period.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
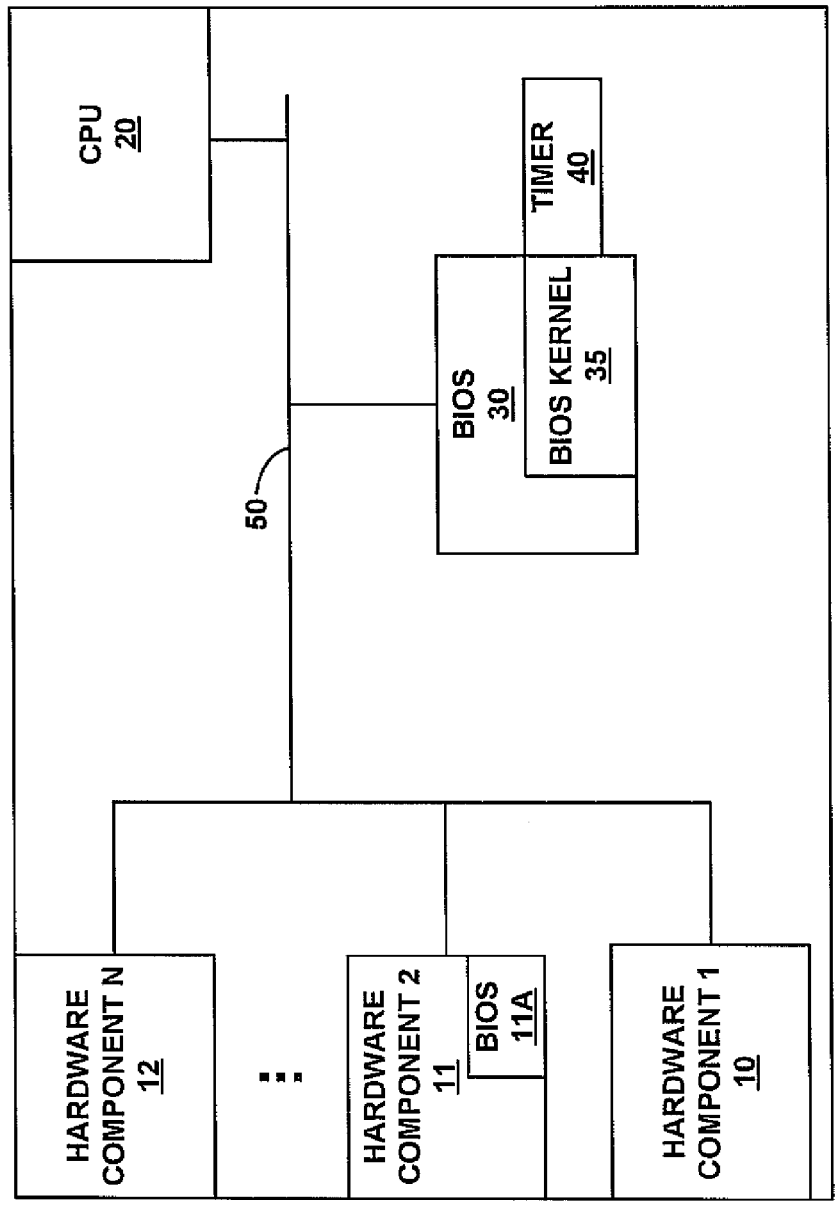
FIG. 1 illustrates a system in accordance with an embodiment of the present invention.

FIG. 1 illustrates a system 100 in accordance with an embodiment of the present invention. The system 100 includes a plurality of hardware components 10-12, a processor or central processing unit (CPU) 20, a BIOS (Basic Input Output System) 30, a timer 40, and a bus 50. Examples of hardware components are a card, chipset, register, hard disk, keyboard, monitor, communication port, RAM (random access memory) memory, mouse, floppy drive, etc. A hardware component can also have a BIOS (e.g., BIOS 11A). The system 100 can be implemented in several different configurations. Examples of these configurations include a computer system, a workstation, a DVD (Digital Video Disc) player, a game console, a graphics chipset, and a graphics card.

The BIOS 30 includes a BIOS kernel 35. The BIOS 30 has a plurality of initialization tasks. Each initialization task has a different priority value. The BIOS 30 uses the CPU 20 to execute the initialization tasks. The BIOS 30 utilizes preemptive multitasking and cooperative multitasking when executing the plurality of initialization tasks. This increases utilization of the processing power of the CPU 20 and ensures higher priority valued initialization tasks are executed with less interruption than lower priority valued initialization tasks. When an initialization task is being executed, the initialization task is able to request a particular waiting period by making a call to the BIOS kernel 35. The BIOS kernel 35 can set the timer 40 to the requested particular waiting period. Thus, during the particular waiting period, the BIOS kernel 35 can start a second initialization task. When the particular waiting period elapses, the BIOS kernel 35 suspends the second initialization task if it has a lower priority value than the initialization task that requested the particular waiting period and starts again the initialization task that was in the waiting state.

Each initialization task is designated a status that facilitates the execution of the initialization tasks. The statuses include executing, waiting, interrupted, completed, and unstarted. Theses statuses are described below.

Figure 2:
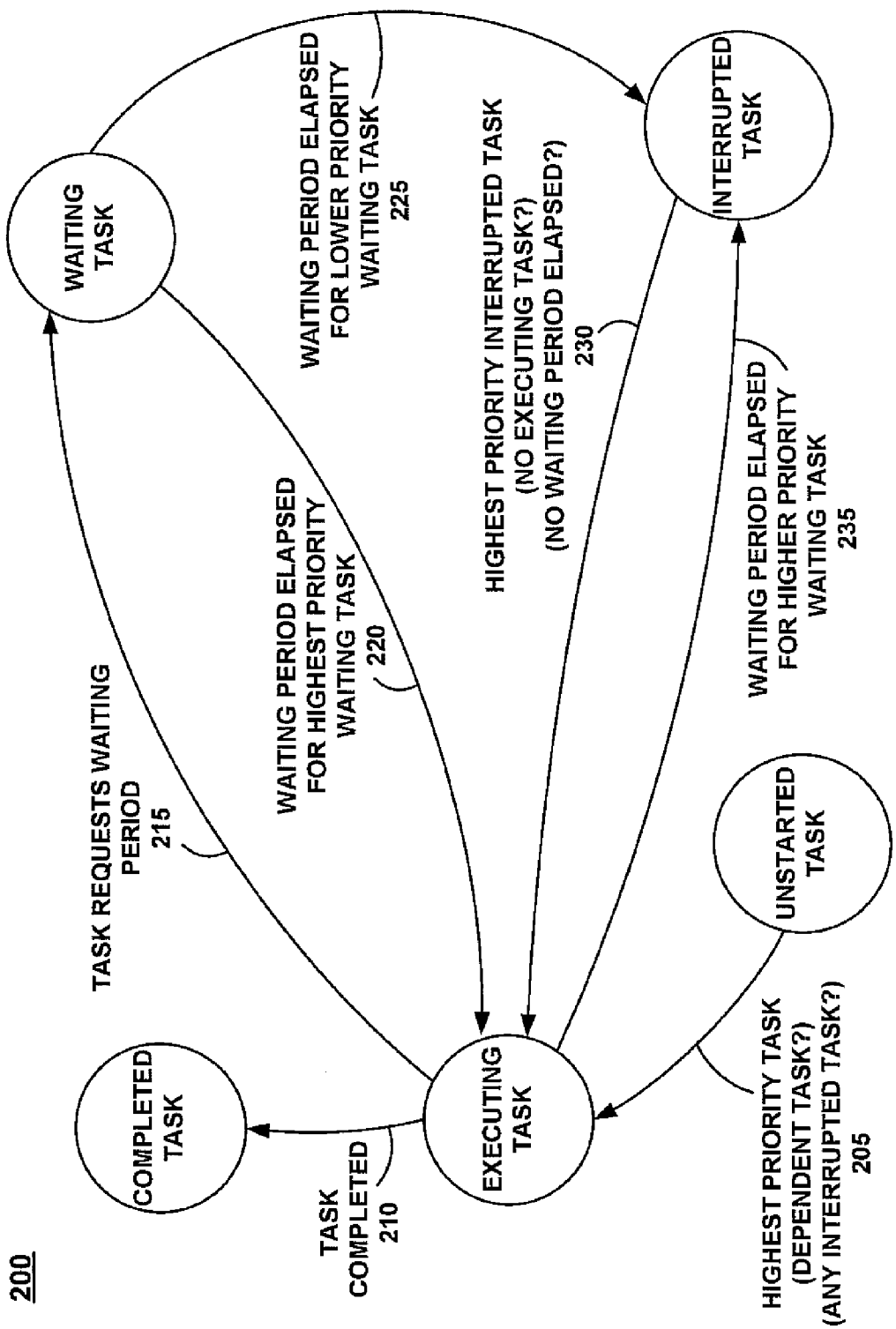
FIG. 2 illustrates a state diagram for BIOS initialization tasks in accordance with an embodiment of the present invention.

FIG. 2 illustrates a state diagram 200 for BIOS initialization tasks in accordance with an embodiment of the present invention, showing the statuses (e.g., executing, waiting, interrupted, completed, and unstarted).

Unstarted Task

If a BIOS initialization task has not been started, the BIOS initialization task is designated as an unstarted task. An unstarted task is selected to start executing if it has the highest priority value of the unstarted tasks, if any dependent initialization tasks have been completed, and if there are no interrupted tasks having a higher priority value than the selected unstarted task. Certain BIOS initialization tasks cannot start executing until the dependent initialization task(s) has been completed. The selected unstarted task is designated as an executing task, as shown by arrow 205.

Executing Task

If a BIOS initialization task has been started and is currently executing, the BIOS initialization task is designated as an executing task. If the executing task has completed, the executing task is designated as a completed task, as shown by arrow 210. If the executing task requests a waiting period by making a call to the BIOS kernel 35, the executing task is suspended and is designated a waiting task, as shown by arrow 215. If the waiting period has elapsed for a waiting task having a higher priority value than the priority value of the executing task, the executing task is suspended and designated as an interrupted task, as shown by arrow 235.

Waiting Task

If a BIOS initialization task, which is currently executing, requests a waiting period (e.g., 10 milliseconds, 50 milliseconds, etc.) by making a call to the BIOS kernel 35, the BIOS initialization task is suspended and is designated a waiting task for the duration of the waiting period. The BIOS kernel 35 can set the timer 40 based on the requested waiting period. If the waiting period has elapsed for several waiting tasks at the same time, the waiting task having the highest priority value (and is also greater than the priority value of the executing task) is started again and designated as an executing task, as shown by arrow 220. If the waiting period has elapsed for any waiting task having a lower priority value than the priority value of the executing task, the waiting task remains suspended and is designated as an interrupted task, as shown by arrow 225.

Interrupted Task

If a BIOS initialization task had been started and is currently suspended without having requested a waiting period, the BIOS initialization task is designated as an interrupted task. If an interrupted task has the highest priority value of the interrupted tasks, if there is no executing task, and if no waiting period has elapsed for the waiting tasks, the interrupted task is started again and designated as an executing task, as shown by arrow 230.

FIGS. 3A-3D illustrate use of preemptive multitasking and cooperative multitasking for executing BIOS initialization tasks in accordance with an embodiment of the present invention. As described above, each BIOS initialization task (or task) has a priority value. The notation TaskX indicates the priority value with X, whereas the lower the value of X the greater is the priority value of TaskX. For example, Task1 has a higher priority value than Task2, Task3, Task4, etc.

Figure 3A:
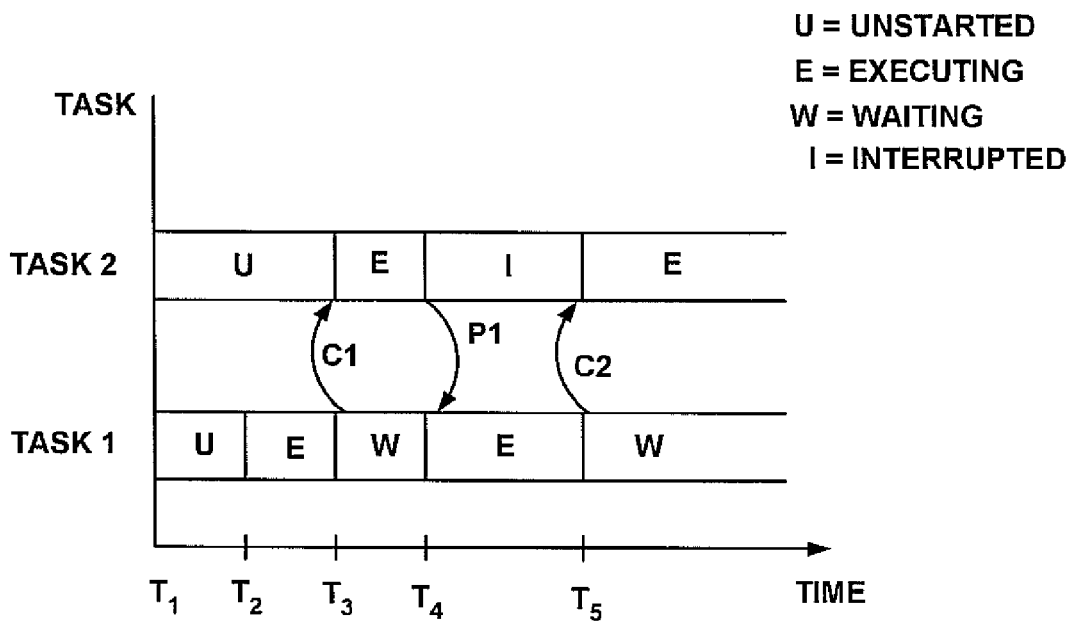
FIGS. 3A-3D illustrate use of preemptive multitasking and cooperative multitasking for executing BIOS initialization tasks in accordance with an embodiment of the present invention.

Referring to FIG. 3A, the plurality of BIOS initialization tasks includes Task1 and Task2. These tasks are designated as unstarted (U) 301 and 311 tasks at time=T1. However, at time=T2, Task1 is selected, started, and designated as an executing (E) 302 task because Task1 has the highest priority value of the unstarted (U) 301 and 311 tasks, Task1 does not have any dependent initialization tasks, and there are no interrupted tasks. At time=T3, Task1 requests a waiting period by making a call to the BIOS kernel 35. Thus, Task1 is suspended and is designated as a waiting (W) 303 task. Moreover, arrow C1 indicates that the BIOS kernel 35 makes a cooperative multitasking transition to Task2 at time=T3. That is, Task2 is started and designated as an executing (E) 312 task.

At time=T4, the waiting period of Task1 has elapsed. Hence, arrow P1 indicates that the BIOS kernel 35 makes a preemptive multitasking transition to Task1 at time=T4. That is, Task1 is started again and designated as an executing (E) 304 task since Task1 has a higher priority value than Task2. Moreover, since the waiting period has elapsed for a waiting (W) 303 task (Task1) having a higher priority value than the priority value of the executing (E) 312 task (Task2), Task2 is suspended and designated as an interrupted (I) 313 task.

At time=T5, Task1 requests a waiting period by making a call to the BIOS kernel 35. Thus, Task1 is suspended and is designated as a waiting (W) 305 task. Moreover, arrow C2 indicates that the BIOS kernel 35 makes a cooperative multitasking transition to Task2 at time=T5. That is, Task2 is started again and designated as an executing (E) 314 task since the interrupted (I) 313 task (Task2) has the highest priority value of the interrupted tasks and there is no executing task.

Figure 3B:
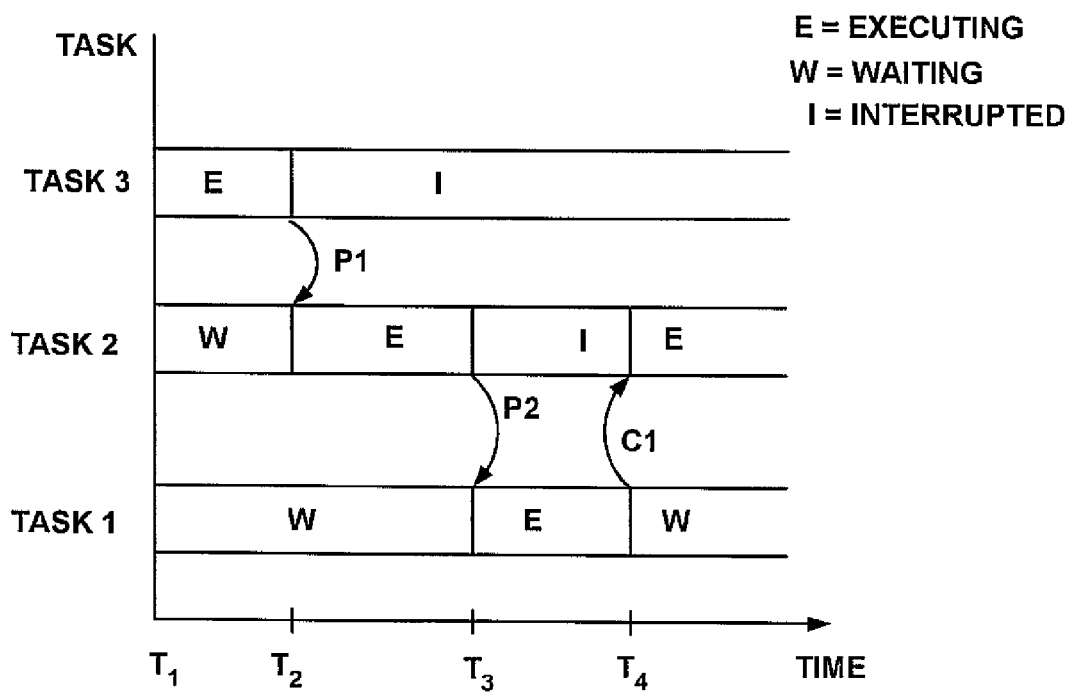

Referring to FIG. 3B, the plurality of BIOS initialization tasks includes Task1, Task2, and Task3. At time=T1, Task1 and Task2 are designated as waiting (W) 321 and 331 tasks while Task3 is designated as an executing (E) 341 task. There are no unstarted tasks. At time=T2, the waiting period of Task2 has elapsed. Hence, arrow P1 indicates that the BIOS kernel 35 makes a preemptive multitasking transition to Task2 at time=T2. That is, Task2 is started again and designated as an executing (E) 332 task since Task2 has a higher priority value than Task3. Moreover, since the waiting period has elapsed for a waiting (W) 331 task (Task2) having a higher priority value than the priority value of the executing (E) 341 task (Task3), Task3 is suspended and designated as an interrupted (I) 342 task.

At time=T3, the waiting period of Task1 has elapsed. Hence, arrow P2 indicates that the BIOS kernel 35 makes a preemptive multitasking transition to Task1 at time=T3. That is, Task1 is started again and designated as an executing (E) 322 task since Task1 has a higher priority value than Task2. Moreover, since the waiting period has elapsed for a waiting (W) 321 task (Task1) having a higher priority value than the priority value of the executing (E) 332 task (Task2), Task2 is suspended and designated as an interrupted (I) 333 task.

At time=T4, Task1 requests a waiting period by making a call to the BIOS kernel 35. Thus, Task1 is suspended and is designated as a waiting (W) 323 task. Moreover, arrow C1 indicates that the BIOS kernel 35 makes a cooperative multitasking transition to Task2 at time=T4. That is, Task2 is started again and designated as an executing (E) 334 task since the interrupted (I) 333 task (Task2) has the highest priority value of the interrupted (I) 333 and 342 tasks (Task2 and Task3) and there is no executing task.

Figure 3C:
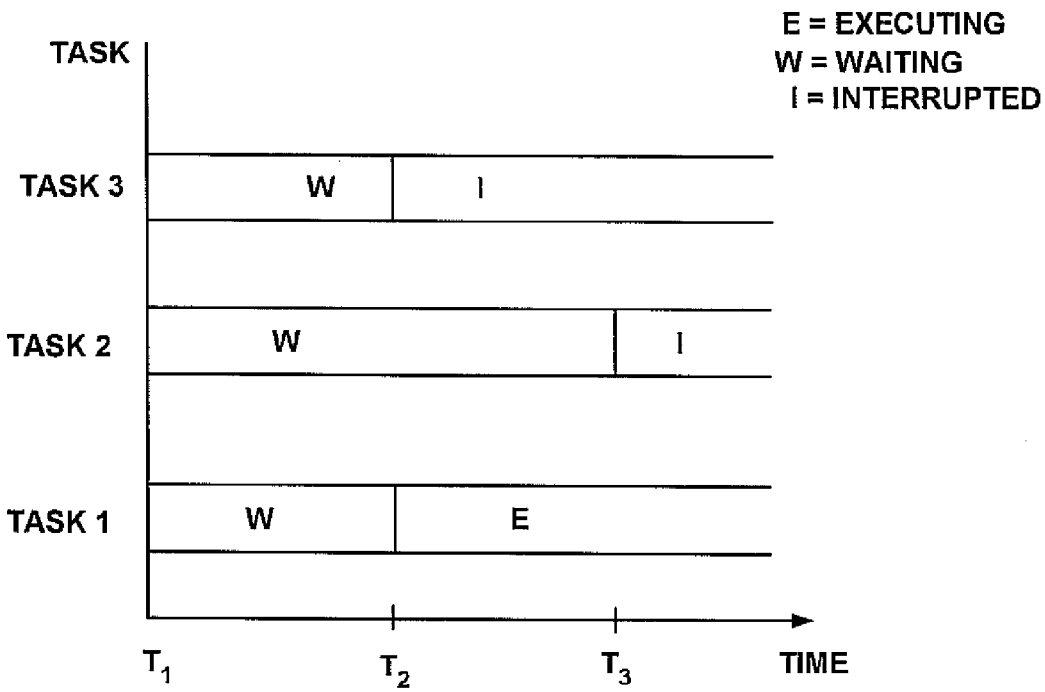

Referring to FIG. 3C, the plurality of BIOS initialization tasks includes Task1, Task2, and Task3. At time=T1, Task1, Task2, and Task3 are designated as waiting (W) 351, 361, and 371 tasks. At time=T2, the waiting period has elapsed for several waiting (W) 351 and 371 tasks (Task1 and Task3) at the same time, the waiting (W) 351 task (Task1) having the highest priority value is started again and designated as an executing task (E) 352 while Task3 remains suspended and is designated as an interrupted (I) 372 task. Moreover, at time=T3, the waiting period has elapsed for Task2 which has a lower priority value than the priority value of the executing (E) 352 task (Task1), the Task2 remains suspended and is designated as an interrupted (I) 362 task.

Figure 3D:
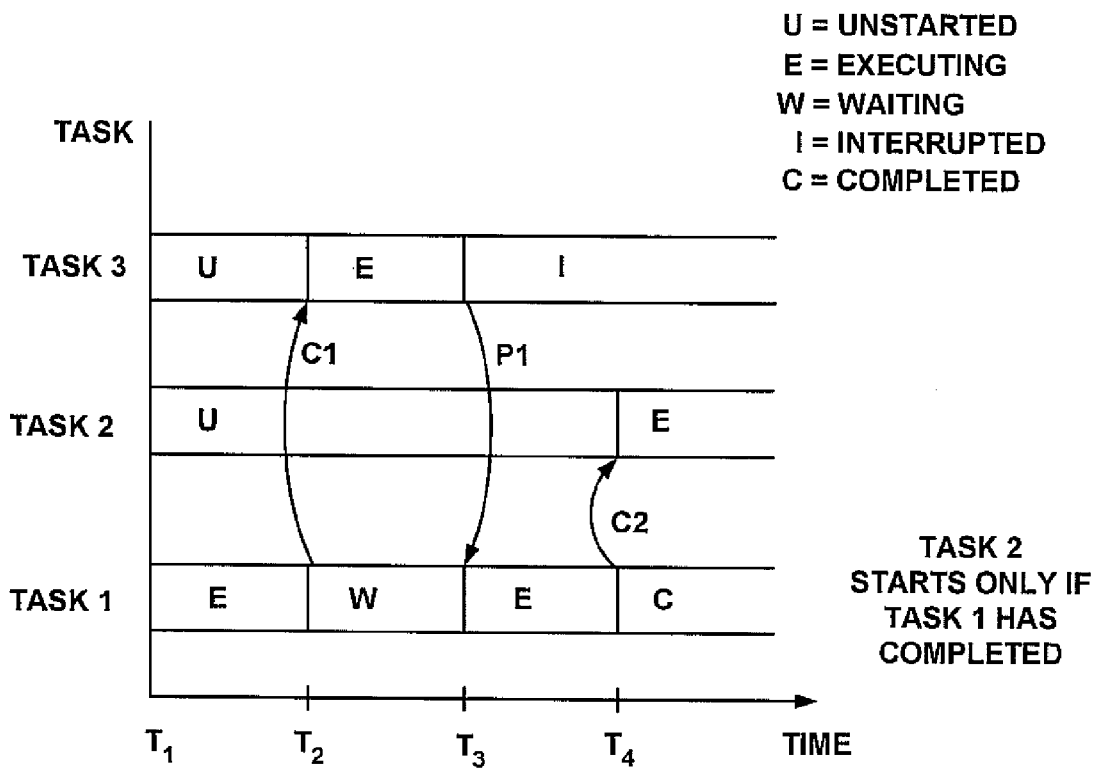

Referring to FIG. 3D, the plurality of BIOS initialization tasks includes Task1, Task2, and Task3. At time=T1, Task1 is designated as executing (E) 381 task while Task2 and Task3 are designated as unstarted (U) 391 and 394 tasks. Moreover, Task2 starts only if Task1 has completed.

At time=T2, Task1 requests a waiting period by making a call to the BIOS kernel 35. Thus, Task1 is suspended and is designated as a waiting (W) 3382 task. Moreover, arrow C1 indicates that the BIOS kernel 35 makes a cooperative multitasking transition to Task3 at time=T2. That is, Task3 is started and designated as an executing (E) 395 task because Task3 has the highest priority value of the unstarted tasks (U) 391 and 394 without any dependent initialization tasks that have not been completed and there are no interrupted tasks.

At time=T3, the waiting period of Task1 has elapsed. Hence, arrow P1 indicates that the BIOS kernel 35 makes a preemptive multitasking transition to Task1 at time=T3. That is, Task1 is started again and designated as an executing (E) 383 task since Task1 has a higher priority value than Task3. Moreover, since the waiting period has elapsed for a waiting (W) 382 task (Task1) having a higher priority value than the priority value of the executing (E) 395 task (Task3), Task3 is suspended and designated as an interrupted (I) 396 task.

At time=T4, Task1 has completed and is designated as a completed (C) 384 task. Moreover, arrow C2 indicates that the BIOS kernel 35 makes a cooperative multitasking transition to Task2 at time=T4. That is, Task2 is started and designated as an executing (E) 392 task because Task2 has the highest priority value of the unstarted (U) 391 tasks, the dependent initialization task (Task1) has been completed, and Task2 has a higher priority value than the interrupted (I) 396 task (Task3).

Figure 4:
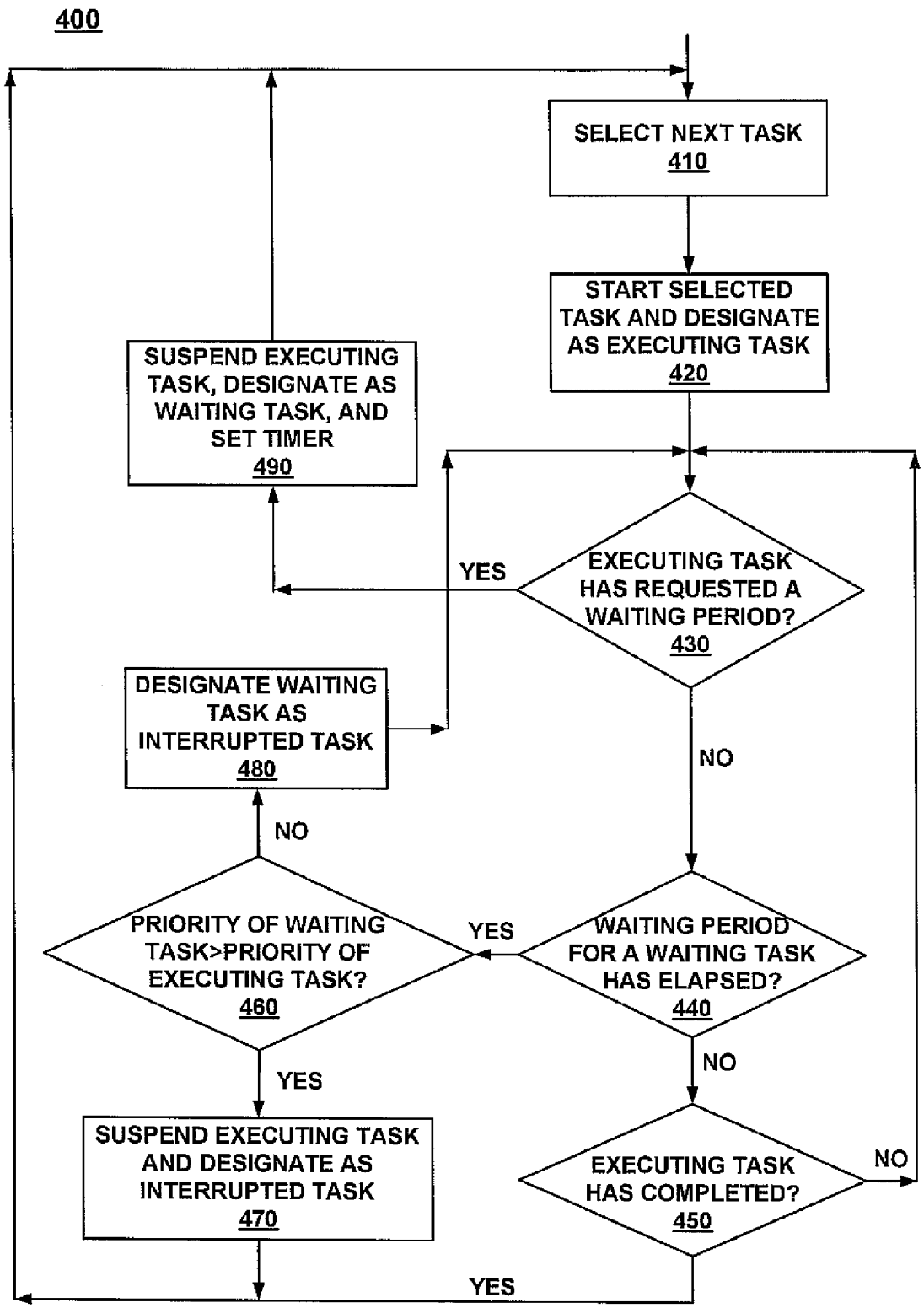
FIG. 4 illustrates a flow chart showing a method for multitasking BIOS initialization tasks in accordance with an embodiment of the present invention.

FIG. 4 illustrates a flow chart showing a method 400 for multitasking BIOS initialization tasks in accordance with an embodiment of the present invention. In an embodiment, the present invention is implemented as computer-executable instructions for performing this method 400. The computer-executable instructions can be stored in any type of computer-readable medium, such as a magnetic disk, CD-ROM (compact disc-read only memory), an optical medium, a floppy disk, a flexible disk, a hard disk, a magnetic tape, a RAM (random access memory), a ROM tread only memory), a PROM (programmable read only memory), an EPROM (erasable programmable read only memory), a flash-EPROM (flash-erasable programmable read only memory), or any other medium from which a computer can read. It should be understood that the method 400 is applicable to tasks other than BIOS initialization tasks.

At Step 410, the next task is selected from the plurality of initialization tasks. The selection is based on the priority values, whereas higher priority valued tasks are selected before lower priority valued tasks. Moreover, the selection is based on the status (e.g., executing, waiting, interrupted, completed, and unstarted) of each task. This selection process is illustrated in the state diagram of FIG. 2. Moreover, at Step 420, the selected task is started and designated as an executing task.

Continuing, at Step 430, it is determined whether the executing task has requested a waiting period by making a call to the BIOS kernel 35 (FIG. 1). If the executing task has requested the waiting period, the method 400 proceeds to Step 490. Otherwise, the method 400 proceeds to Step 440.

At Step 490, the executing task is suspended and designated as a waiting task for the duration of the waiting period. The BIOS kernel 35 can set the timer 40 (FIG. 1) based on the requested waiting period. After Step 490, the method 400 proceeds to Step 410 again.

If the executing task has not requested the waiting period, after Step 430 the method 400 proceeds to Step 440. At Step 440, it is determined whether a waiting period for a waiting task has elapsed. If a waiting period for a waiting task has elapsed, the method 400 proceeds to Step 460. Otherwise, the method 400 proceeds to Step 450.

At Step 450, it is determined whether the executing task has completed. If the executing task has completed, the method 400 proceeds to Step 410 again. Otherwise, after Step 450 the method 400 proceeds to Step 430 again.

If a waiting period for a waiting task has elapsed, after Step 440 the method 400 proceeds to Step 460. At Step 460, it is determined whether the priority value of the waiting task is higher than the priority value of the executing task. If the priority value of the waiting task is higher than the priority value of the executing task, the method 400 proceeds to Step 470. Otherwise, the method 400 proceeds to Step 480.

At Step 470, the executing task is suspended and designated as an interrupted task. After Step 470, the method 400 proceeds to Step 410 again.

If the priority value of the waiting task is not higher than the priority value of the executing task, the method 400 proceeds to Step 480. At Step 480, the waiting task is designated as an interrupted task. After Step 480, the method 400 proceeds to Step 430 again.

Hence, method and system for multitasking BIOS initialization tasks have been described. Moreover, a BIOS that utilizes preemptive multitasking and cooperative multitasking in executing the BIOS initialization tasks has been described.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of executing a plurality of tasks of different priority values, said method comprising:

utilizing preemptive multitasking and cooperative multitasking in execution of said plurality of tasks, wherein each task has a different priority value;

before starting any of said plurality of tasks, selecting and starting execution of a first task of said plurality of tasks, wherein said first task has highest priority value and is not dependent on completion of any other of said plurality of tasks;

while said first task is executing, receiving a request for a particular waiting period from said first task;

for duration of said particular waiting period, suspending execution of said first task; and selecting a next task to execute, wherein said selecting said next task comprises:

selecting said next task from said plurality of tasks based on said priority values of said plurality of tasks and based on status designations representative of execution progress of said plurality of tasks, wherein said status designations include executing, waiting, interrupted, completed, and unstarted;

starting said selected task and changing status designation of said selected task to an executing task;

if said executing task requests a waiting period, suspending said executing task and changing status designation of said executing task to a waiting task and repeating said selecting said next task and said starting said selected task;

if said waiting period elapses for any waiting task and said executing task has a higher priority value than said waiting task, changing status designation of said waiting task to an interrupted task while allowing said executing task to continue execution;

if said waiting period elapses for any waiting task and said executing task does not have a higher priority value than said waiting task, suspending said executing task and changing status designation of said executing task to an interrupted task and repeating said selecting said next task and said starting said selected task; and if said executing task completes execution, changing status designation of said executing task to a completed task and repeating said selecting said next task and said starting said selected task.

2. The method as recited in claim 1 wherein said selecting said next task from said plurality of tasks includes:
selecting higher priority values before selecting lower priority values when possible.

3. The method as recited in claim 1 wherein said selecting said next task from said plurality of tasks includes:
if a first particular task cannot be executed until a second particular task has completed execution, enabling selection of said first particular task after said second particular task has completed execution.

4. The method as recited in claim 1 further comprising:
setting a timer based on said waiting period.

5. The method as recited in claim 1 wherein said plurality of tasks are BIOS (Basic Input Output System) initialization tasks.

6. The method as recited in claim 5 wherein a BIOS kernel receives said request for said particular waiting period.

7. A non-transitory computer-readable medium comprising computer-executable instructions stored therein for performing a method of executing a plurality of tasks of different priority values, said method comprising:
utilizing preemptive multitasking and cooperative multitasking in execution of said plurality of tasks, wherein each task has a different priority value;
before starting any of said plurality of tasks, selecting and starting execution of a first task of said plurality of tasks, wherein said first task has highest priority value and is not dependent on completion of any other of said plurality of tasks;
while said first task is executing, receiving a request for a particular waiting period from said first task;
for duration of said particular waiting period, suspending execution of said first task; and
selecting a next task to execute, wherein said selecting said next task comprises:
selecting said next task from said plurality of tasks based on said priority values of said plurality of tasks and based on status designations representative of execution progress of said plurality of tasks, wherein said status designations include executing, waiting, interrupted, completed, and unstarted;
starting said selected task and changing status designation of said selected task to an executing task;
if said executing task requests a waiting period, suspending said executing task and changing status designation of said executing task to a waiting task and repeating said selecting said next task and said starting said selected task;
if said waiting period elapses for any waiting task and said executing task has a higher priority value than said waiting task, changing status designation of said waiting task to an interrupted task while allowing said executing task to continue execution;
if said waiting period elapses for any waiting task and said executing task does not have a higher priority value than said waiting task, suspending said executing task and changing status designation of said executing task to an interrupted task and repeating said selecting said next task and said starting said selected task; and
if said executing task completes execution, changing status designation of said executing task to a completed task and repeating said selecting said next task and said starting said selected task.

8. The non-transitory computer-readable medium as recited in claim 7 wherein said selecting said next task from said plurality of tasks includes:
selecting higher priority values before selecting lower priority values when possible.

9. The non-transitory computer-readable medium as recited in claim 7 wherein said selecting said next task from said plurality of tasks includes:
if a first particular task cannot be executed until a second particular task has completed execution, enabling selection of said first particular task after said second particular task has completed execution.

10. The non-transitory computer-readable medium as recited in claim 7 further comprising:
setting a timer based on said waiting period.

11. The non-transitory computer-readable medium as recited in claim 7 wherein said plurality of tasks are BIOS (Basic Input Output System) initialization tasks.

12. The non-transitory computer-readable medium as recited in claim 11 wherein a BIOS kernel receives said request for said particular waiting period.

* * * * *